(12) United States Patent
Pengg (10) Patent No.: US 8,166,616 B2
(45) Date of Patent: May 1, 2012

(54) TURNBUCKLE

(75) Inventor: Ägyd Pengg, Klagenfurt (AT)

(73) Assignee: Pewag Schneeketten GmbH & Co KG, Bruckl (AT)

( * ) Notice: Subject to any disclaimer, the term of this patent is extended or adjusted under 35 U.S.C. 154(b) by 336 days.

(21) Appl. No.: 12/535,737

(22) Filed: Aug. 5, 2009

(65) Prior Publication Data
US 2010/0034578 A1 Feb. 11, 2010

(30) Foreign Application Priority Data

Aug. 7, 2008 (EP) ...................................... 08450120
May 29, 2009 (EP) ...................................... 09450107

(51) Int. Cl.
*B60C 27/10* (2006.01)

(52) U.S. Cl. ...................................... 24/68 TT; 152/219

(58) Field of Classification Search ............... 24/68 CD, 24/68 R, 68 CT, 68 B, 909, 71 ST, 71.1; 254/217, 254/218, 223, 237–239; 152/217–219, 233; 242/384.2, 384.5, 384.7, 289, 381.5
See application file for complete search history.

(56) References Cited

U.S. PATENT DOCUMENTS

| 2,593,018 | A | 4/1952 | Fendrock |
| 6,213,421 | B1 * | 4/2001 | Franklin ..................... 242/384.7 |
| 7,900,670 | B2 * | 3/2011 | McCauley et al. ............ 152/219 |

FOREIGN PATENT DOCUMENTS

| AT | 412 202 B | 11/2004 |
| AT | 504 476 A4 | 6/2008 |
| AT | 504 599 A1 | 6/2008 |
| DE | 297 03 911 U1 | 4/1997 |
| JP | 2007261570 A * | 10/2007 |
| JP | 2008155913 A * | 7/2008 |
| WO | WO 2004022363 A1 * | 3/2004 |

* cited by examiner

*Primary Examiner* — James Brittain
(74) *Attorney, Agent, or Firm* — RatnerPrestia (57) ABSTRACT

A turnbuckle for an anti-skid chain that can be mounted on the wheel of a vehicle. A tension cable is connected inside the turnbuckle housing to a winding roll that is pre-stressed in the winding-up direction and mounted so that it can be rotated about its axle. A ratchet wheel with at least one ratchet catch allocated to it is provided on the winding roll and the tension cable can be blocked against its direction of tension by gripping of the ratchet catch into the ratchet wheel. The ratchet catch is moved at least incrementally outwards from the idle position when the wheel isn't moving, in which it is disengaged from the ratchet wheel and the tension cable is not blocked, under the action of the centrifugal force upon rotation of the wheel, and this movement effects a gripping of the ratchet catch into the ratchet wheel.

13 Claims, 8 Drawing Sheets

, # TURNBUCKLE

FIELD OF THE INVENTION

The invention relates to a tensioning device for an anti-skid chain for putting on the wheel of a vehicle, with a housing and a tension cable that can be pulled in through an opening in the housing, wherein the tension cable is attached inside the housing to a winding roll that is pre-stressed in the winding-up direction and mounted so that it rotates about its axle, wherein the winding roll is provided with a ratchet wheel with at least at least one ratchet catch allocated to it and the tension cable can be blocked against its direction of tension by the ratchet catch gripping into the ratchet wheel.

BACKGROUND

Tensioning devices are used for anti-skid chains in order to avoid an undesired return of the tension cable against the direction of tension after assembly. A possible application of the turnbuckle on the anti-skid chain, or rather the tension cable, is known e.g. from AT 412 202 B.

A tensioning device of the type named in the introduction is envisaged in DE 297 03 911 U1. In this tensioning device, a housing is provided, in which the tension cable can be wound up on a winding drum that is joined torque-proof to a ratchet wheel. The winding drum is pre-stressed for winding up the tension cable in the winding-up direction by a spring. The winding up of the tension cable can be activated by an operating lever which is affixed on the exterior of the housing. A disadvantage of this device is the relatively impractical manipulation of the operating lever, which can also easily get jammed if it gets dirty or icy.

Turnbuckles are known from AT 504 476 B and AT 504 599 B for which a mass piece is provided that is moved radially outwards when mounted by the emerging centrifugal force in the turnbuckle upon the rotation of a wheel. A wire-shaped, free end section of a tension cable is clamped by the movement of the mass piece. In the turnbuckle underlying the present invention, however, there is no free end provided to the tension cable on which a clamping element could act. Rather, the tension cable and hence its end section is wound up on a winding roll of the turnbuckle. Inherently to their design, the known embodiments are not well suited to temporary fixing of a tension cable of a turnbuckle of the type named in the introduction, since, in a generic turnbuckle, direct catching of the tension cable by a moving mass piece would lead to a complicated construction of the turnbuckle.

In U.S. Pat. No. 2,593,018 a chain joint is disclosed in which an end of a chain cable ends in a ring link that is pulled into the chain joint by spring force. The ring link furthermore has a shoulder that rests on an edge of the chain joint housing while the ring link is retracted, and is held there provided that the chain joint is located in a suitable position of orientation. A release pin is provided for release of the ring link.

SUMMARY OF THE INVENTION

An aspect of the invention is a turnbuckle of the kind named in the introduction, which does not have to be manually operated in order to release and which has robust and simple construction appropriate for rough service.

In one embodiment this is achieved according to the invention with a turnbuckle of the type named in the introduction in such a way that the ratchet catch is moved at least incrementally outwards from an idle position that it is in when the wheel is still and in which it is not in engagement with the ratchet wheel and the tension cable is not blocked, by the action of the centrifugal force upon rotation of the wheel, and this movement effects a gripping of the ratchet catch into the ratchet wheel.

According to an exemplary embodiment, the ratchet catch represents a centrifugal force pendulum that is brought into engagement with the ratchet wheel as a result of the centrifugal force present above a certain rate of rotation of the vehicle wheel, and which returns to its original position when the wheel stops, or rather upon a reduction in the rate of rotation of the wheel. Hence above a certain rate of rotation of the wheel, or rather speed of the wheel, the ratchet catch locks into the ratchet wheel and so the tension cable is locked against its winding-up direction, through which an undesired winding up of the tension cable can be prevented and a secure hold of the anti-skid chain on the tire is guaranteed, without an adverse effect on mounting of the chain thereby coming about.

Another embodiment, which is distinguished by a simple and hence inexpensive to produce construction, involves the ratchet catch being excentrically mounted about an axle so it can be rotated, wherein a free end section not acting together with the ratchet catch is constructed longer and more massive than a second end section of the ratchet catch acting together with the ratchet wheel. In this variation of the invention, the ratchet wheel advantageously has gearing on an outer circumferential surface, through which a further simplification of the construction can be achieved.

A vary compact design can be achieved by the ratchet wheel having gearing on an inner circumferential surface, with which the ratchet catch can be brought into engagement by the pushing and/or pulling effected by the centrifugal force, wherein the ratchet catch is surrounded by the ratchet wheel.

A flat construction of the turnbuckle is achieved in that the ratchet catch is constructed in a plate shape and has at least one appendage which can be brought into engagement with the ratchet wheel.

According to an advantageous variation of the invention, the ratchet catch is loaded with at least one spring acting against the centrifugal force. By application of the spring force, a defined engagement of the ratchet catch as well as a secured returning of the ratchet catch back in its original position can be guaranteed. By returning into the original position by the spring force, it can be ensured that no undesired blocking of the tension cable comes about during mounting or removal of the anti-skid chain.

Another variation of the invention for achieving a simple and compact embodiment envisages that the ratchet catch is located so that it can be moved in a radial direction on a guide pin of the housing, wherein the ratchet catch has slot for the guide pin, wherein the end section of the ratchet catch that fits into the slot and that has the extension has the largest part of the mass of the ratchet catch.

An embodiment that is distinguished by a simple construction and a simple installation of the spring envisages that a helical spring is provided that is arranged between the guide pin and an end section of the recess opposite the end section, with an extension, that can be brought into engagement with the ratchet catch.

In order to guarantee a very good conduction and definition of the course of motion of the ratchet catch, and therefore a very good functionality, the ratchet catch can be located so that it can be rotated about an axle in the area of its end section that acts together with the ratchet wheel. The ratchet catch can hereby have a recess as a slot for the aforementioned guide pin of the housing. An end section of the ratchet catch, which is connected to the recess, free, opposite the end section acting together with the ratchet catch, can hereby have the greatest part of the mass of the ratchet catch.

A simplified assembly and a compact design of the turnbuckle can be achieved in that the winding roll and the ratchet wheel are constructed in one piece with each other. Winding roll and ratchet wheel can, however, also be separate components that are joined upon fabrication of the turnbuckle.

Moreover the ratchet catch can, for example in further development of the variations with a gearing on an inner peripheral surface of the ratchet wheel, be located so it can be moved along a guide in the housing. Hereby the guide can allow a movement of the ratchet catch according to a bent path, on one end of which the ratchet catch with its protrusions engages with the ratchet wheel.

BRIEF DESCRIPTION OF THE DRAWINGS

The invention together with further advantages is further explained in what follows on the basis of a few non-limiting exemplary embodiments that are showed in the drawings, which schematically show.

DETAILED DESCRIPTION OF THE INVENTION

Figure 1:
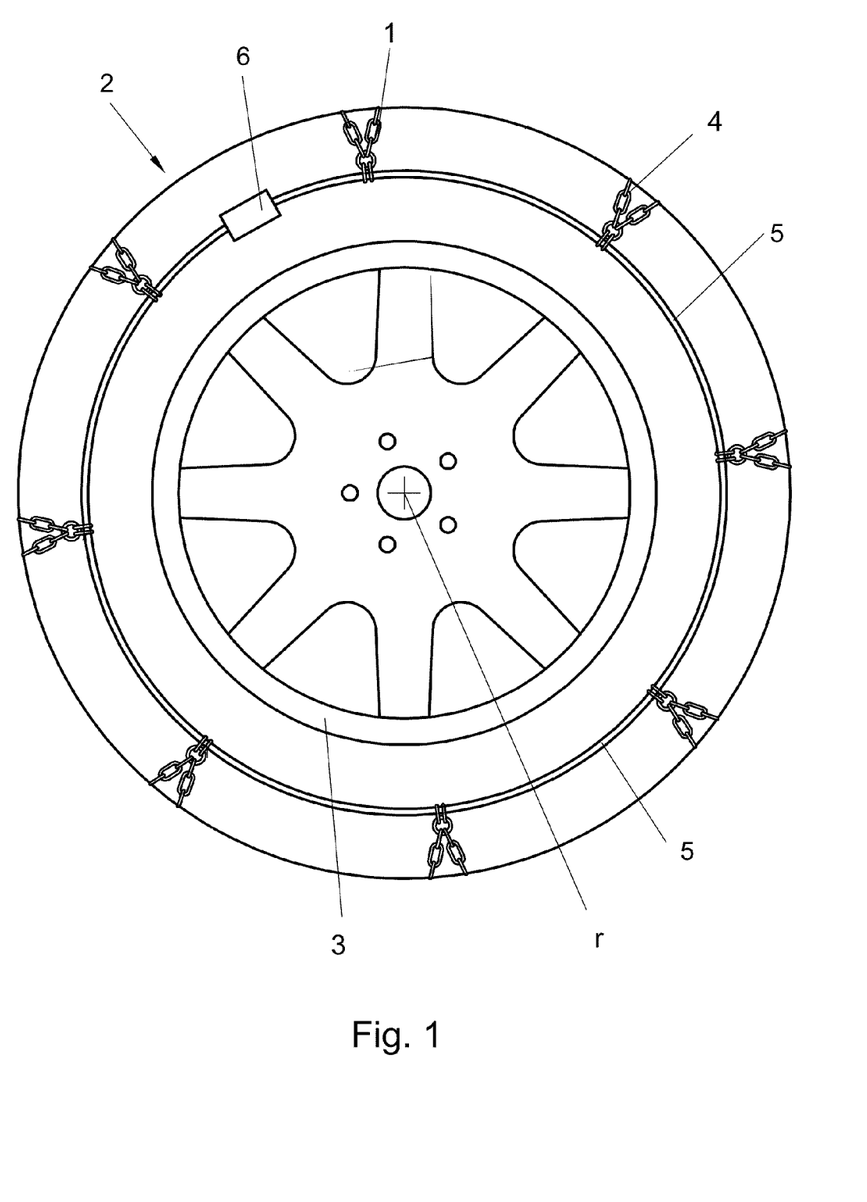
FIG. 1 an anti-skid chain with a turnbuckle for its one side cable, mounted on a vehicle tire, in side view.

In FIG. 1 an anti-skid chain 1, which is pulled onto a tire 2 of a vehicle wheel 3 with the wheel axle r, is shown in side view. The chain web 4 of the anti-skid chain 1 is held together, or rather stressed, on the inner and the outsides of the tire, or rather the wheel, in the known way by side cables 5. A turnbuckle 6 holds the tension cable against the direction of tension during a turning motion of the wheel.

To this end, it should be noted that the side cables 5 on the inside of the tire can be constructed elastically and held together by a turnbuckle 6 according to the invention, wherein on the outside another construction can be used. On the other hand, the whole tensioning device including the turnbuckle can be constructed the same on the inside and the outside. In any case, the invention is not limited to one of the two sides in its application.

The side cable 5 can have a mainspring—for example a spiral spring. A tension cable, labeled with the label 7 in what follows, can run in the interior of the spiral spring. The tensile strength of the mainspring constituting the casing is so large that the anti-skid chain 1, for example a snow chain, is tensioned after application of the chain.

FIGS. 2 to 6 show embodiments according to the invention 20, 30, 40, 50, 60 of the turnbuckle 6. Of course, the invention is not limited to the shown embodiments, rather combinations of the embodiments are possible, as well as modifications to them so long as they fall within the range of the claims.

Figures 2, 2A:
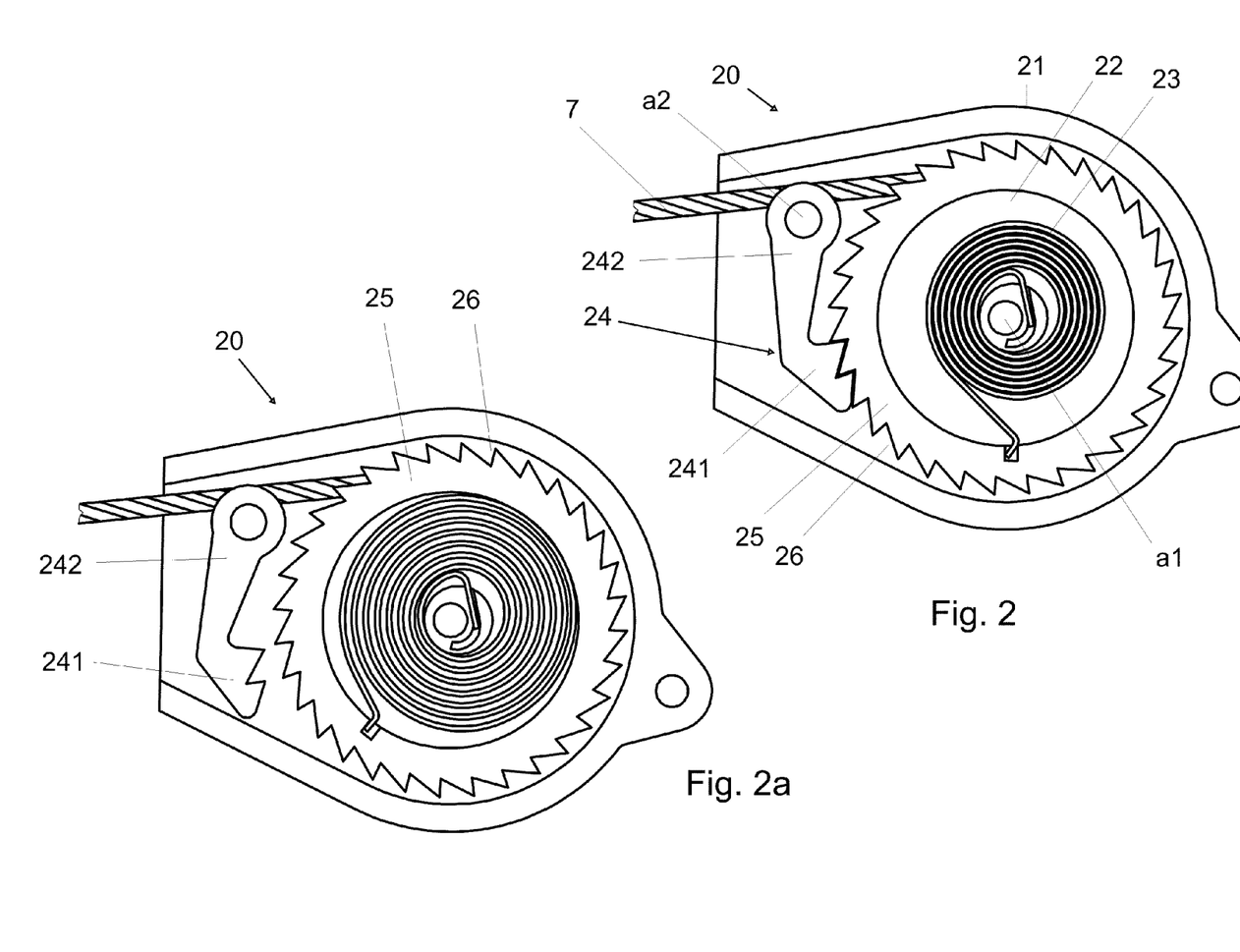
FIG. 2 a first version of a turnbuckle according to the invention with a removed housing cover, wherein the ratchet catch is located in a blocking position.
FIG. 2a the turnbuckle from FIG. 1, wherein the ratchet catch is located in a clearance position.
Figure 3:
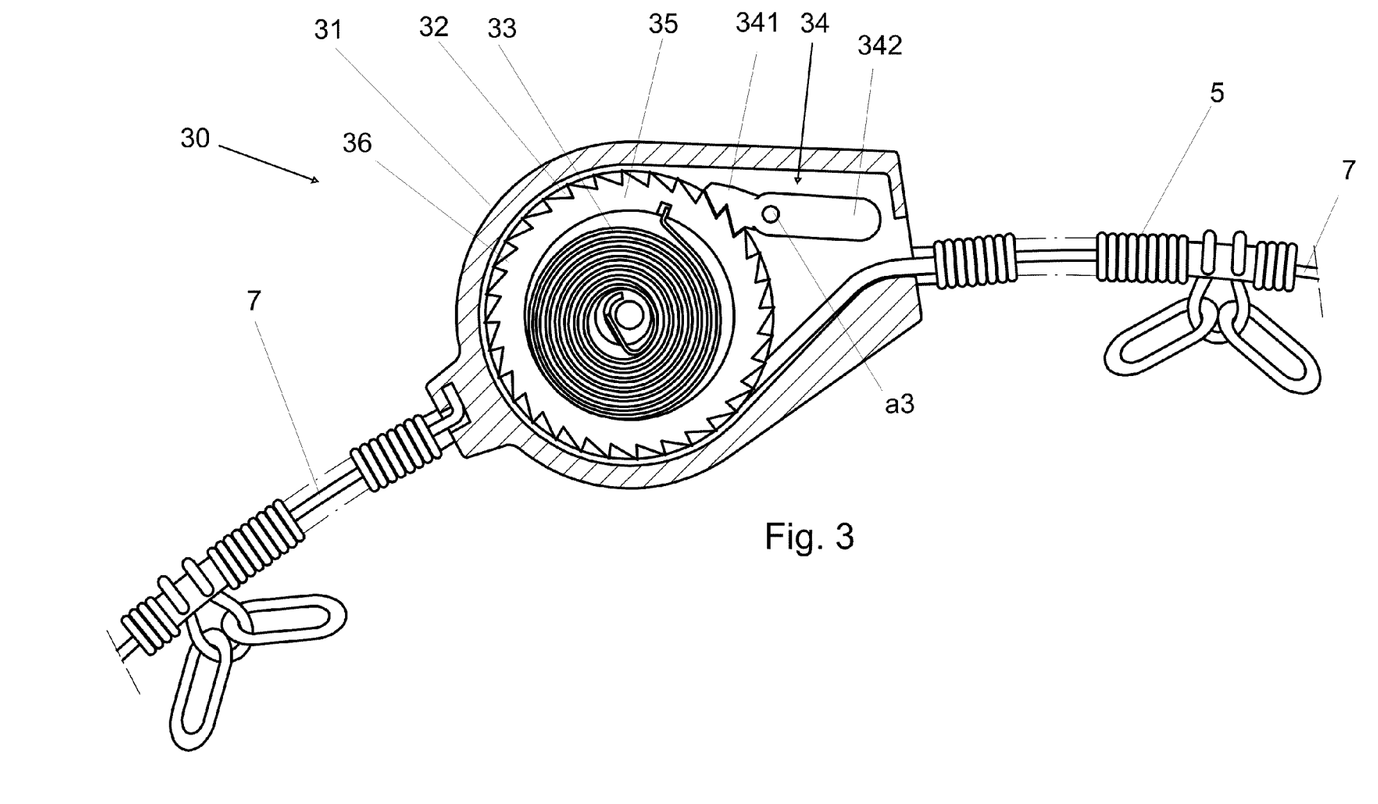
FIG. 3 a second variation of a turnbuckle according to the invention with a removed housing cover, wherein the ratchet catch is located in a blocking position.

According to FIG. 2, the turnbuckle 20 has a housing 21 according to a first embodiment. The tension cable 7 can be pulled through a housing opening into the housing 21, or rather out of the housing 21. Inside the housing 21, the tension cable 7 is connected to winding roll 22—that is pre-stressed in the winding-up direction and is located so it can be rotated about its axle a1—on which the tension cable 7 can be wound up. The winding roll 22 can e.g. be pre-stressed with a spiral spring 23 in the winding-up direction, the ends of which are fixed to the winding roll 22 and the housing 21 of the turnbuckle 20. The other end of the tension cable 7 can be fastened on the outside of the housing 21 of the turnbuckle 20, as can be seen in FIG. 3.

A ratchet wheel 25 with at least one ratchet catch 24 is provided on the winding roll 22. The ratchet wheel 25 has a gearing 26 on an outer circumferential surface. By gripping of the ratchet catch 24 into the ratchet wheel 25, the tension cable 7 can be blocked against its direction of tension. It is the case for all shown embodiments of the invention that the ratchet catch and the gearing of the ratchet wheel can be constructed congruently to each other. The winding roll 22 and the ratchet wheel 25 can advantageously be constructed in one piece with each other in all variations of the invention.

FIG. 2a shows the ratchet catch 24 when the wheel 3 is still. Here, the ratchet catch 24 is in an idle position, in which it is not in engagement with the ratchet wheel 25, the tension cable 7 is not blocked and can be pulled out of the housing under the action of a force against its winding-up direction, and the anti-skid chain 1 can be put on or off the tire 2. The turnbuckle 20 serves to fix the tension cable 7 even under the action of considerable forces in operation, and hence to guarantee a good hold of the anti-skid chain 1.

It is the case for all shown embodiments of the invention that, under the action of the centrifugal force generated by a rotation of the wheel 3, the ratchet catch 24 is moved at least incrementally outwards from what is its idle position when the wheel 3 is not moving, in which it is not in engagement with the ratchet wheel 25 and the tension cable 7 is not blocked. An engagement of the ratchet catch 24 into the ratchet wheel 25 is effected by the movement generated by the centrifugal force.

As can be seen from the depictions in FIGS. 2 and 2a, the ratchet catch 24 can be mounted excentrically around an axle a2. According to FIGS. 2 and 2a, the mounting of the ratchet catch can be carried out with its end section 242, which faces the end 241 acting together with the ratchet catch 25.

As is shown in FIG. 3, in another embodiment 30 of a turnbuckle according to the invention a free end section 342 of the ratchet catch 34 not acting together with the ratchet wheel 35 can be built longer and more massive than a second end section 341 of the ratchet catch acting together with the ratchet wheel 35. The more massive piece 342 can be moved outwards by the centrifugal force, whereby a rotation of the ratchet catch 34 comes about in the housing 31 about the axle a3. Through this rotation the section 341 is brought into engagement with the gearing 36 on the outer peripheral surface of the ratchet wheel 35. Upon reduction or discontinuation of the centrifugal force, the more massive piece falls back into its rest position, whereby the section 341 of the ratchet catch 34 frees itself from the gearing 36. The remaining components, in particular winding roll 32 and spiral spring 33, correspond to those of the embodiments of FIGS. 2 and 2a.

Figure 4:
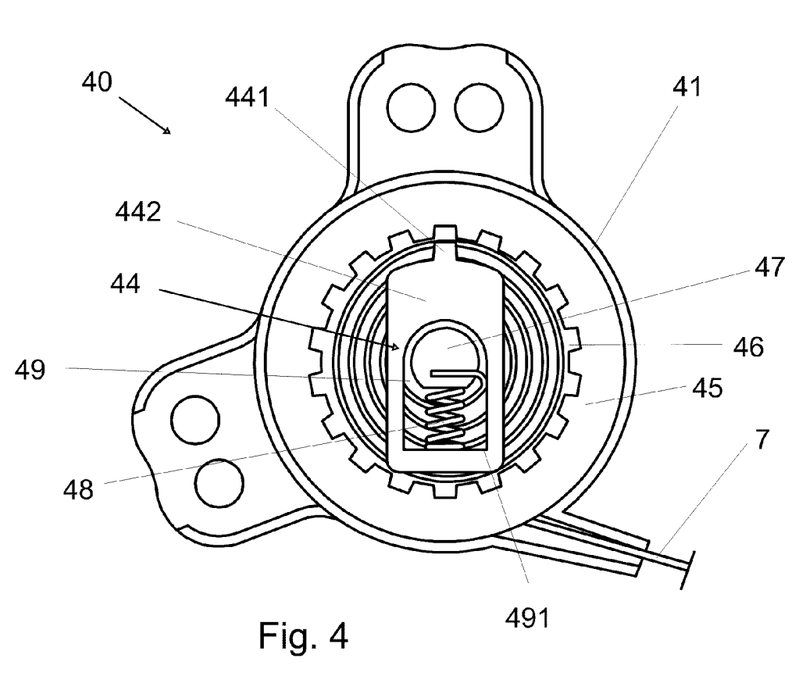
FIG. 4 a third variation of a turnbuckle according to the invention with a removed housing cover, wherein the ratchet catch is located in a clearance position.

According to the variation of a turnbuckle 40 according to the invention shown in FIG. 4, the ratchet catch 44 can be mounted in the housing 41 so that it can be radially moved. The ratchet wheel 45 hereby has a gearing 46 on its inner circumferential surface, with which the ratchet catch can be brought into engagement by a pushing and/or turning of the ratchet catch effected by centrifugal force. The ratchet wheel 45 is hereby constructed in one piece with the winding roll, wherein the gearing is arranged on a circular recess of the winding roll. In other words, an inner circumferential surface of the ratchet wheel 45 can have the gearing 46, while an outer circumferential surface is there for winding up the tension cable 7.

The ratchet catch 44 is encircled on its sides by the ratchet wheel 45, or rather the gearing 46. I.e. the ratchet wheel 45 or gearing 46 is arranged around the ratchet catch 44 when seen on the same sectional plane, so that however the ratchet wheel 45 is turned the ratchet catch 44 can be brought into engagement with the gearing 46.

The ratchet catch 44 depicted is constructed in a plate shape and has at least one extension 441 that can be brought into engagement with the ratchet wheel 45, or rather the gearing 46. The extension 441 and the gearing 46 are constructed congruently to each other. In the embodiment of the invention shown here the extension 441 is constructed in a trapezoid shape, wherein the gearing 46 has corresponding trapezoid-shaped recesses.

Furthermore, the ratchet catch 44 is loaded with a spring 48 acting against the centrifugal force. The ratchet catch 44 is mounted on a pin 47 of the housing so that it can be moved in the radial direction, wherein the ratchet catch 44 has a recess 49 as a slot for the guide pin 47. The end section 442 of the ratchet catch is moved in the direction of the gearing 46 of the ratchet wheel 45 upon rotation of the wheel 3. The aforementioned spring 48, which can be designed as a helical spring, is arranged between the guide pin 47 and the end section 491 of the recess 49.

Figure 5:
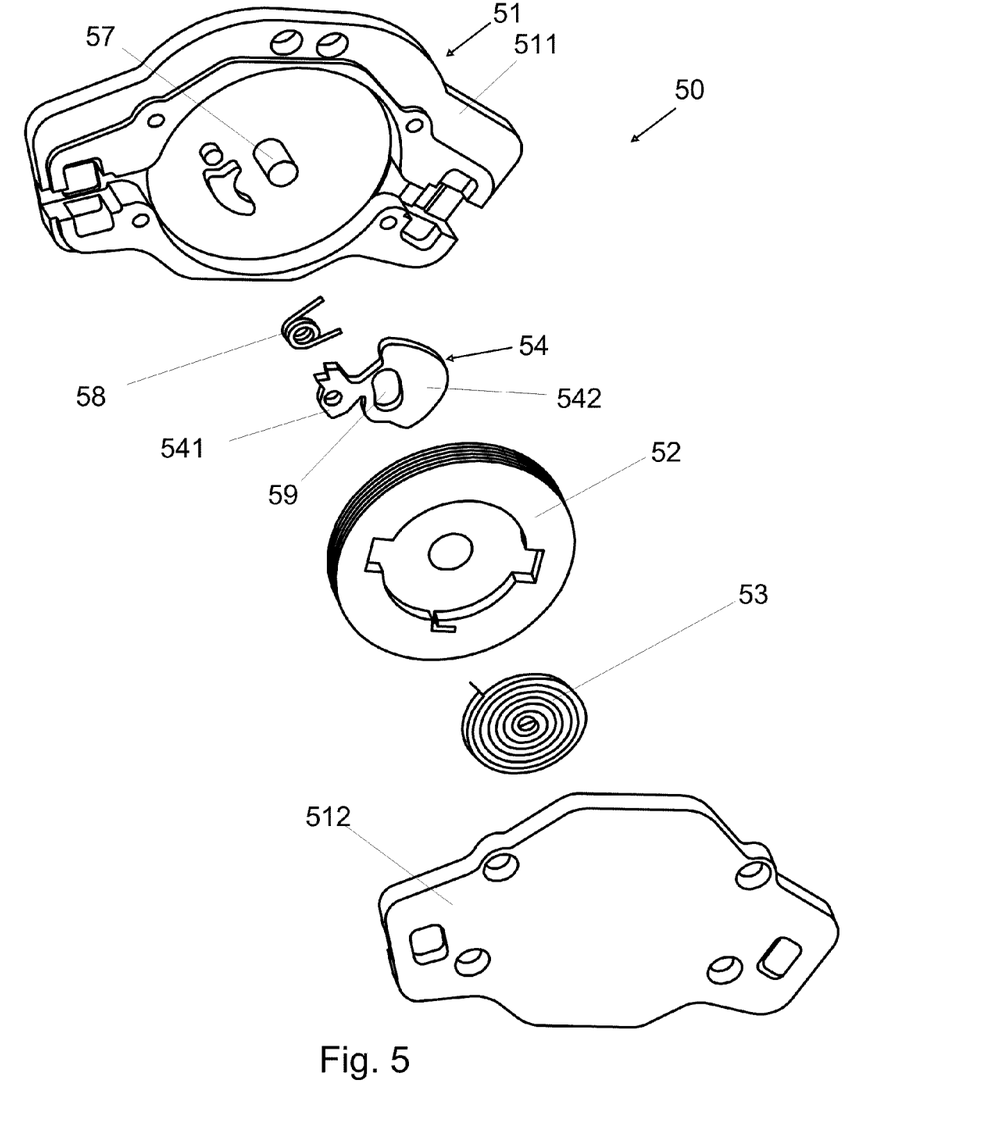
FIG. 5 an exploded view of a fourth variation of a turnbuckle according to the invention.
Figure 5A:
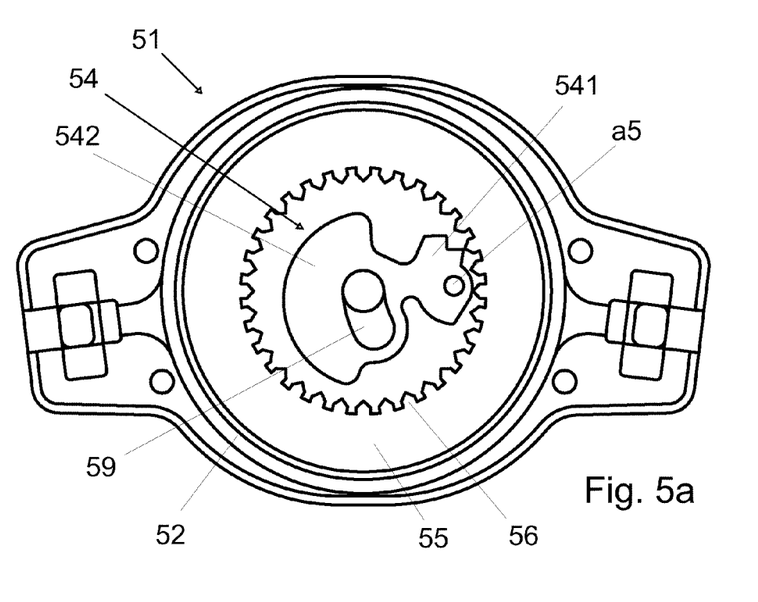
FIG. 5a a rear view of the turnbuckle from FIG. 5 with removed housing base piece and FIG. 5b a top view of the turnbuckle from FIG. 5 with removed housing cover.
Figure 5B:
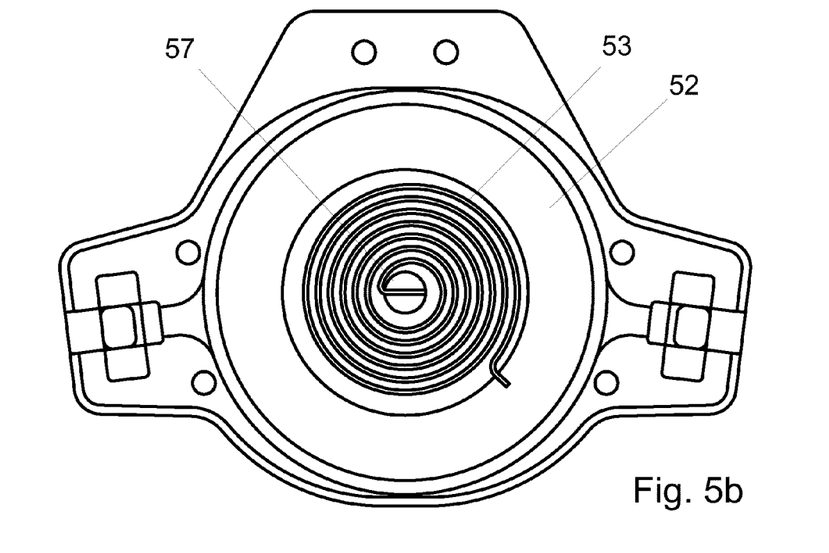

Henceforth making reference to the variations of the invention shown in FIGS. 5, 5a and 5b, the plate-shaped ratchet catch 54 of the turnbuckle 50 can be mounted so it can be rotated about an axle a5 in the area of its end section 541 acting together with the ratchet wheel 55. The ratchet wheel 55 and the winding roll 52 can be constructed in this variation of the invention in the same way as in the variation described above and shown in FIG. 4. The housing 51 here consists of two pieces, a housing base piece 511 and a housing cover 512. In the turnbuckle 50 shown in FIGS. 5-5b, the ratchet catch 54 has a recess 59 as a slot for the pin 57 of the housing 51. FIG. 5a hereby shows the turnbuckle 50, in which the housing base piece 511 is removed (view of the inside of the housing cover 512), while FIG. 5b shows a top view of the turnbuckle with the housing cover 512 removed. The pin 57 can have a groove as a slot for an end section of the spiral spring 53, and hence serve as a securing element of the spiral spring 53 in the housing 51. The recess 59 is adapted to the direction of rotation of the ratchet catch 54 about the axle a5, so that an unhindered turning of the ratchet catch 54 can take place under the influence of the centrifugal force. A free end section 542, or rather piece of the ratchet catch 54, connected to the recess 59, has the greatest mass of the ratchet catch 54. Under the influence of the centrifugal force, the piece 542 can be moved outwards, giving rise to a rotation about the axle a5 and to an engagement of the extension 541 into the gearing 56 of the ratchet wheel. In this variation of the invention, too, the ratchet catch 54 is spring-loaded, wherein here a spring 58 that supports, or rather is fastened to, the housing of the turnbuckle and to the ratchet catch advantageously comes into use.

In FIGS. 6, 6a-6c a further variation of the invention is shown in which the turnbuckle 60 has a ratchet catch 64, the movement of which is determined by a guide instead of by an axle box arrangement.

On the other hand, in this embodiment the housing consists of two pieces, namely housing base piece 611 and housing cover 612, which are joined e.g. by rivets 610. The turnbuckle 60 is advantageously located with the back of its base piece 611 to the tire when the chain 1 is mounted. In addition, as can be seen from FIG. 6, both ends of the turnbuckle 7 are wound up on the winding roll 62. The winding up of both ends of the cable offers the advantage of a symmetrical shortening of the turnbuckle. The winding roll 62 is pre-stressed by means of a spiral spring 63 as in the other embodiments. The ratchet wheel 65 is a separate component from the winding roll 62 in the embodiment of FIG. 6, which is engaged with the winding roll 62 via knobs 651 on the outside of the ratchet wheel and which is equipped with an inner gearing 66. The asymmetrical configuration of the knobs 651 has manufacturing advantages and additionally adduces an improved cohesion between ratchet wheel and winding roll.

In this variation, the ratchet catch 64 is not mounted in an axle pin; rather the movement of the ratchet catch is defined by a guide. To this end, a guide piece 67 is provided in the housing, which cannot be moved relative to the housing, and which is preferably one piece with the housing base piece 611 and arranged in the interior of this on the housing base. The ratchet catch 64 has a shape that forms a recess surrounding the guide piece, wherein the ratchet catches slide along the flanks of the guide piece and can reinforce themselves perpendicular to this movement on the guide piece 67. As can be seen from FIGS. 6b and 6c, the ratchet catch 64 in particular has two end sections 641, 642 located opposite each other, and which are linked by a mid section 643 guided around the guide piece. The two end sections 641, 642 each abut with one flank against the guide piece 67. The flanks can be bent as shown, typically in the shape of concentric surfaces of revolution, e.g. cylinder barrel sections, so that they define a curved path of the ratchet catch 64.

The two end sections 641, 642 of the ratchet catch 64, on the other hand, are built large, and the outer end section 642 has the overwhelming (i.e. largest) part of the mass of the ratchet catch. Overall, the ratchet catch 64 is shaped in such a way that it is located further outside relative to the guide pin 67. (In this, the expression "outside" is to be understood in relation to the axle r of a wheel, to which the chain 1 together with turnbuckle is mounted.) When there is a turning movement of the wheel the ratchet catch 64 is therefore moved outwards, i.e. in FIG. 6b upwards, under the influence of the centrifugal force. Here the ratchet catch 64 comes into engagement with the gearing 66 via extensions 646 constructed on the mid section 643, and so effects a blocking of the ratchet wheel 65 and of the winding roll 63 acting together with it. As a result of the aforementioned curvilinear guide, here the piece of the gearing 66 acting together with the extensions 646 of the ratchet catch 64 is clearly less loaded on shearing. The forces emerging when the ratchet wheel 65 is blocked are taken up by the guide piece 67.

Figures 6, 6A:
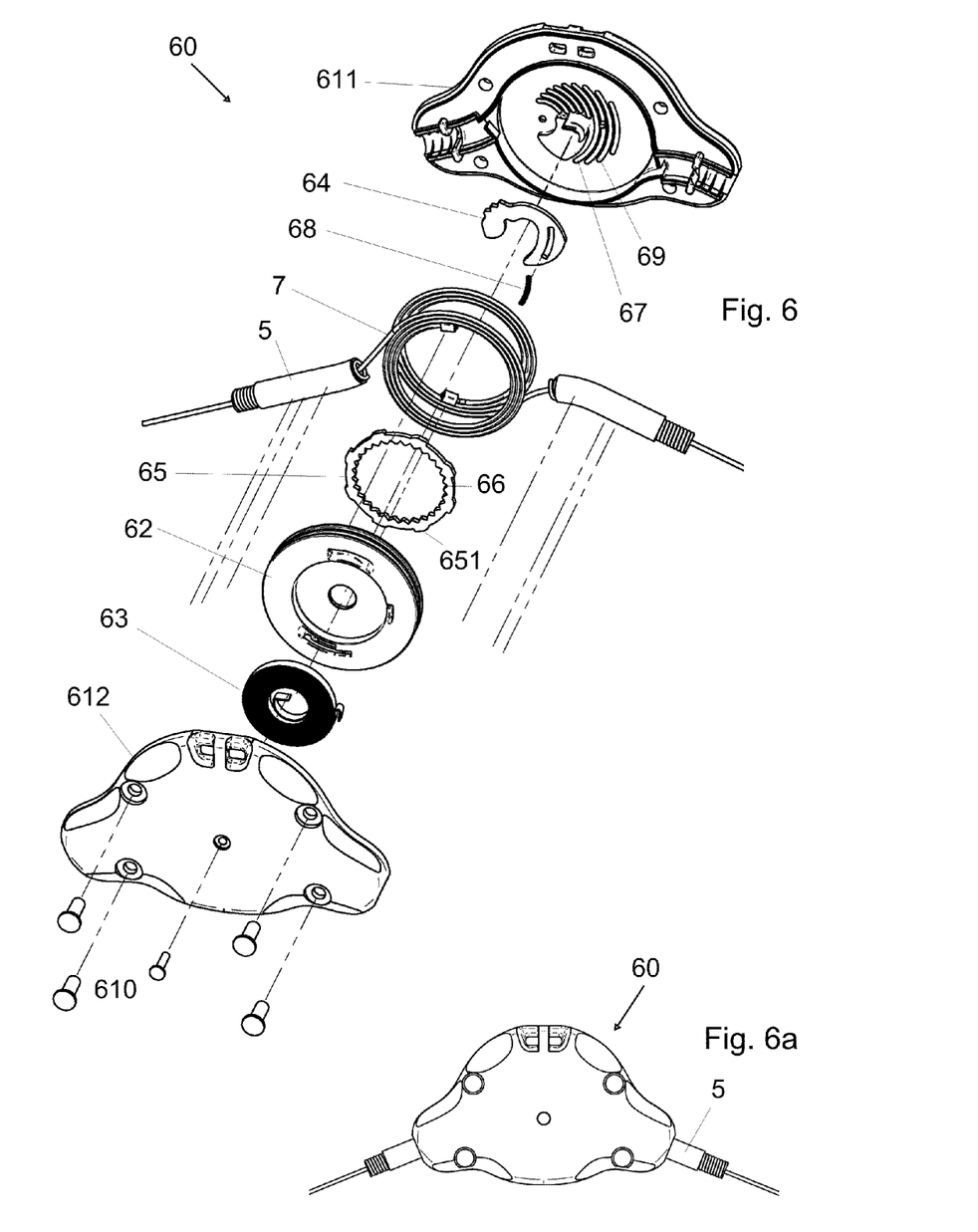
FIG. 6 an exploded view of a turnbuckle according to a further embodiment variation of the invention.
FIG. 6a a side view of the turnbuckle from FIG. 5.
Figure 6B:
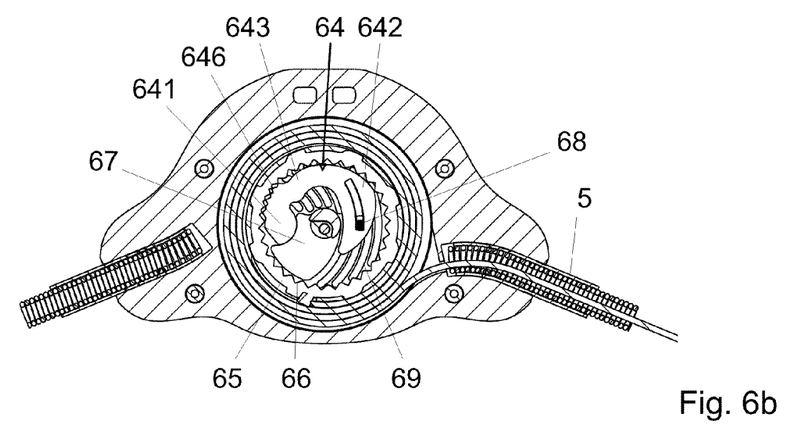
FIG. 6b a side view of the turnbuckle from FIG. 6, wherein the ratchet catch is located in a blocking position.
Figure 6C:
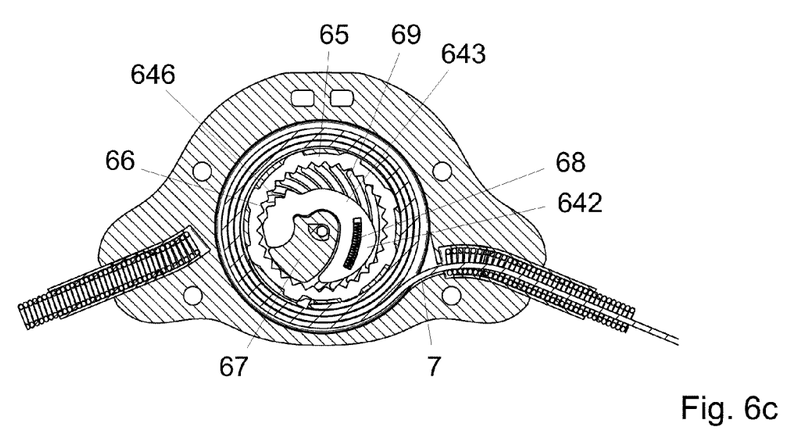
FIG. 6c a side view of the turnbuckle from FIG. 6, wherein the ratchet catch is located in a clearance position.

In order to achieve a reliable replacement of the ratchet catch 64 into the clearance position shown in FIG. 6c, when the wheel comes to a halt, a return spring 68 can be provided in the outer end section 642, which counteracts the centrifugal force emerging when the wheel turns. The return spring 68 is e.g. a helical spring that is accommodated in a concentric guide provided in the end section 642 with the curvilinear flanks.

As can be further seen from FIG. 6, the ratchet catch is constructed in a plate shape and is located with its flat sides on one side of those of the winding roll 62, on the other side on the inside of the housing base piece, namely the housing base. In order to improve the mobility of the ratchet catch 64, the housing base can be equipped with ridges 69 that decrease the effective contact surface and so assist a sliding of the ratchet catch 64 upon its movement along the guide piece 67. If desired, the ridges 69 can be shaped in such a way that they additionally contribute to the guidance of the ratchet catch 64.

Of course, the invention shown is not limited to the shown exemplary embodiments, but rather comprises all embodiments falling under the independent claim. In particular, the shown exemplary embodiments can also be combined with each other whenever appropriate. In particular, a ratchet catch like that shown in FIG. 6 can be used as an axle by means of a bolt protruding from it, or alternatively the other embodiment by means of a guide instead of an axle.

The invention claimed is:

1. A turnbuckle for an anti-skid chain that can be mounted on a wheel of a vehicle, comprising:
   a housing; and
   a tension cable that can be pulled through a housing opening into the housing,
   wherein the tension cable is connected inside the housing to a winding roll that is pre-stressed in a winding-up direction and mounted so the winding roll can be rotated about an axle of the winding roll,
   wherein a ratchet wheel with at least one ratchet catch is provided on the winding roll and the tension cable can be blocked against a direction of tension by the ratchet catch engaging with the ratchet wheel, and
   wherein the ratchet catch is moved at least incrementally outwards from an idle position when the wheel is stationary, in which the ratchet catch is not in engagement with the ratchet wheel and the tension cable is not blocked, under the action of the centrifugal force upon rotation of the wheel, and this movement effects an engagement of the ratchet catch with the ratchet wheel.

2. The turnbuckle according to claim 1, wherein the ratchet catch is mounted so the ratchet catch can be turned about an axle.

3. The turnbuckle according to claim 2, wherein a free end section not acting together with the ratchet wheel is constructed longer and more massive that a second end section of the ratchet catch acting together with the ratchet wheel.

4. The turnbuckle according to claim 3, wherein the ratchet wheel has a gearing on an outer circumferential surface.

5. The turnbuckle according to claim 1, wherein the ratchet catch is constructed in a plate-shape and has at least one extension that can be brought into engagement with the ratchet wheel.

6. The turnbuckle according to claim 5, wherein the ratchet catch is loaded with at least one spring acting against the centrifugal force.

7. The turnbuckle according to claim 5, wherein the ratchet catch is mounted so the ratchet catch can be moved in a radial direction on a guide pin of the housing, and wherein the ratchet catch has a recess for the guide pin.

8. The turnbuckle according to claim 7, wherein a helical spring is provided, which is arranged between the guide pin and an end section of the recess opposite the end section that has the extension that can be brought into engagement with the ratchet wheel.

9. The turnbuckle according to claim 5, wherein the ratchet catch is mounted at an end section thereof to an axle so that the ratchet catch can be rotated about the axle acting together with the ratchet wheel, wherein the ratchet catch has a recess as a slot for a guide pin of the housing and an end section of the ratchet catch connected to the recess, free, opposite the end section acting together with ratchet wheel has the overwhelming portion of the mass of the ratchet catch.

10. The turnbuckle according to claim 5, wherein the ratchet catch is mounted so the ratchet catch can be moved along a guide held in the housing.

11. The turnbuckle according to claim 10, wherein the guide allows a movement of the ratchet catch according to a curvilinear path, on the end of which the ratchet catch grips into the ratchet wheel by means of at least one extension.

12. The turnbuckle according to claim 1, wherein the ratchet wheel has a gearing on an inner circumferential surface, with which the ratchet catch can be brought into engagement by at least one of a pushing and a rotation of the ratchet catch effected by the centrifugal force, and wherein the ratchet catch is surrounded by the ratchet wheel.

13. The turnbuckle according to claim 1, wherein the winding roll and the ratchet wheel are constructed in one piece with each other.

\* \* \* \* \*